US011945221B2

(12) United States Patent
Shimosato

(10) Patent No.: US 11,945,221 B2
(45) Date of Patent: Apr. 2, 2024

(54) LIQUID EJECTION HEAD AND LIQUID EJECTION DEVICE

(71) Applicant: TOSHIBA TEC KABUSHIKI KAISHA, Tokyo (JP)

(72) Inventor: Masashi Shimosato, Mishima Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 134 days.

(21) Appl. No.: 17/539,602

(22) Filed: Dec. 1, 2021

(65) Prior Publication Data

US 2022/0258471 A1 Aug. 18, 2022

(30) Foreign Application Priority Data

Feb. 18, 2021 (JP) ................................ 2021-024525

(51) Int. Cl.
*B41J 2/045* (2006.01)
*B41J 2/14* (2006.01)

(52) U.S. Cl.
CPC ....... *B41J 2/14274* (2013.01); *B41J 2/04581* (2013.01); *B41J 2/04588* (2013.01)

(58) Field of Classification Search
CPC .................................................... B41J 2/04581
See application file for complete search history.

(56) References Cited

U.S. PATENT DOCUMENTS 8,752,926 B2 6/2014 Konishi
9,162,455 B2 10/2015 Konishi
10,160,223 B2 12/2018 Kaneko
2002/0154195 A1* 10/2002 Sumi .................... B41J 2/04588 347/68
2005/0052482 A1* 3/2005 Ito ........................ B41J 2/04593 347/68
2010/0118072 A1* 5/2010 Iwashita .............. B41J 2/04581 347/10
2010/0245493 A1 9/2010 Uraki
2011/0221828 A1* 9/2011 Sakai .................. C01G 23/003 347/68

(Continued)

FOREIGN PATENT DOCUMENTS

CN 107776203 A 3/2018
JP 2013184309 A 9/2013

(Continued)

OTHER PUBLICATIONS

Extended European Search Report dated Jul. 5, 2022, mailed in counterpart European Application No. 22151493.8, 7 pages.

(Continued)

*Primary Examiner* — Shelby L Fidler
(74) *Attorney, Agent, or Firm* — Kim & Stewart LLP

(57) ABSTRACT

According to one or more embodiments, a liquid ejection head includes an actuator and a driver. The actuator has a piezoelectric element made of a lead-free piezoelectric material. The driver applies a voltage to the actuator to vibrate the piezoelectric element in a first direction with a first electric field in a first polarization direction of the piezoelectric element and a second electric field in a direction opposite to the first polarization direction. The second electric field is controlled to be equal to or less than a coercive electric field of the piezoelectric element.

19 Claims, 7 Drawing Sheets

(56) References Cited

U.S. PATENT DOCUMENTS

| | | | | |
|---|---|---|---|---|
| 2012/0161578 | A1 | 6/2012 | Shimada et al. | |
| 2012/0180315 | A1 | 7/2012 | Shimosato | |
| 2016/0159102 | A1 | 6/2016 | Kaneko | |
| 2016/0225976 | A1 * | 8/2016 | Yokoyama | B41J 2/04541 |
| 2019/0232658 | A1 | 8/2019 | Nystrom et al. | |

FOREIGN PATENT DOCUMENTS

| | | | |
|---|---|---|---|
| JP | 2014054800 | A | 3/2014 |
| JP | 2014058078 | A | 4/2014 |
| JP | 6164511 | B2 | 7/2017 |

OTHER PUBLICATIONS

U.S. Appl. No. 17/535,109, filed Nov. 24, 2021.

Yokendo, AEM Society, "Lead-free Piezoelectric Ceramics Devices", Sep. 9, 2008, Chapter 3, 31 pages.

Chinese Office Action dated Nov. 7, 2023, mailed in counterpart Chinese Application No. 202111364472.1, 16 pages (with translation).

* cited by examiner

| | d33 | CURIE TEMPERATURE |
|---|---|---|
| PZT | ~400pC/N | ~300℃ |
| BaTiO3 | 350 pC/N OR MORE | ~130℃ |
| (Bi Na)TiO3-BASED | ~220pC/N | ~278℃ |
| (Bi K)TiO3-BASED | ~97pC/N | ~520℃ |
| K0.5Na0.5NbO3-BASED | ~250pC/N | ~400℃ |

LIQUID EJECTION HEAD AND LIQUID EJECTION DEVICE

CROSS-REFERENCE TO RELATED APPLICATION

This application is based upon and claims the benefit of priority from Japanese Patent Application No. 2021-024525, filed Feb. 18, 2021, the entire contents of which are incorporated herein by reference.

FIELD

Embodiments described herein relate generally to a liquid ejection head and a liquid ejection device.

BACKGROUND

Inkjet heads using lead-containing piezoelectric materials, such as lead zirconate titanate (PZT), have been commercialized. Unfortunately, lead-containing piezoelectric materials such as PZT may be harmful to the environment. Therefore, inkjet heads using a lead-free piezoelectric material are desirable. However, it has been difficult to put lead-free piezoelectric materials into practical use in inkjet heads because of high material costs and certain material characteristics of such materials, such as the piezoelectric constant (piezoelectric modulus), are generally not comparable to conventional materials for inkjet heads.

DETAILED DESCRIPTION

According to an embodiment, a liquid ejection head includes an actuator and a driver. The actuator includes a piezoelectric element comprising a lead-free piezoelectric material. The driver applies a voltage to the actuator to vibrate the piezoelectric element with a first electric field in a first polarization direction and in second polarization direction opposite to the first polarization direction with a second electric field that is equal to or less than a coercive electric field of the piezoelectric element.

Figure 1:
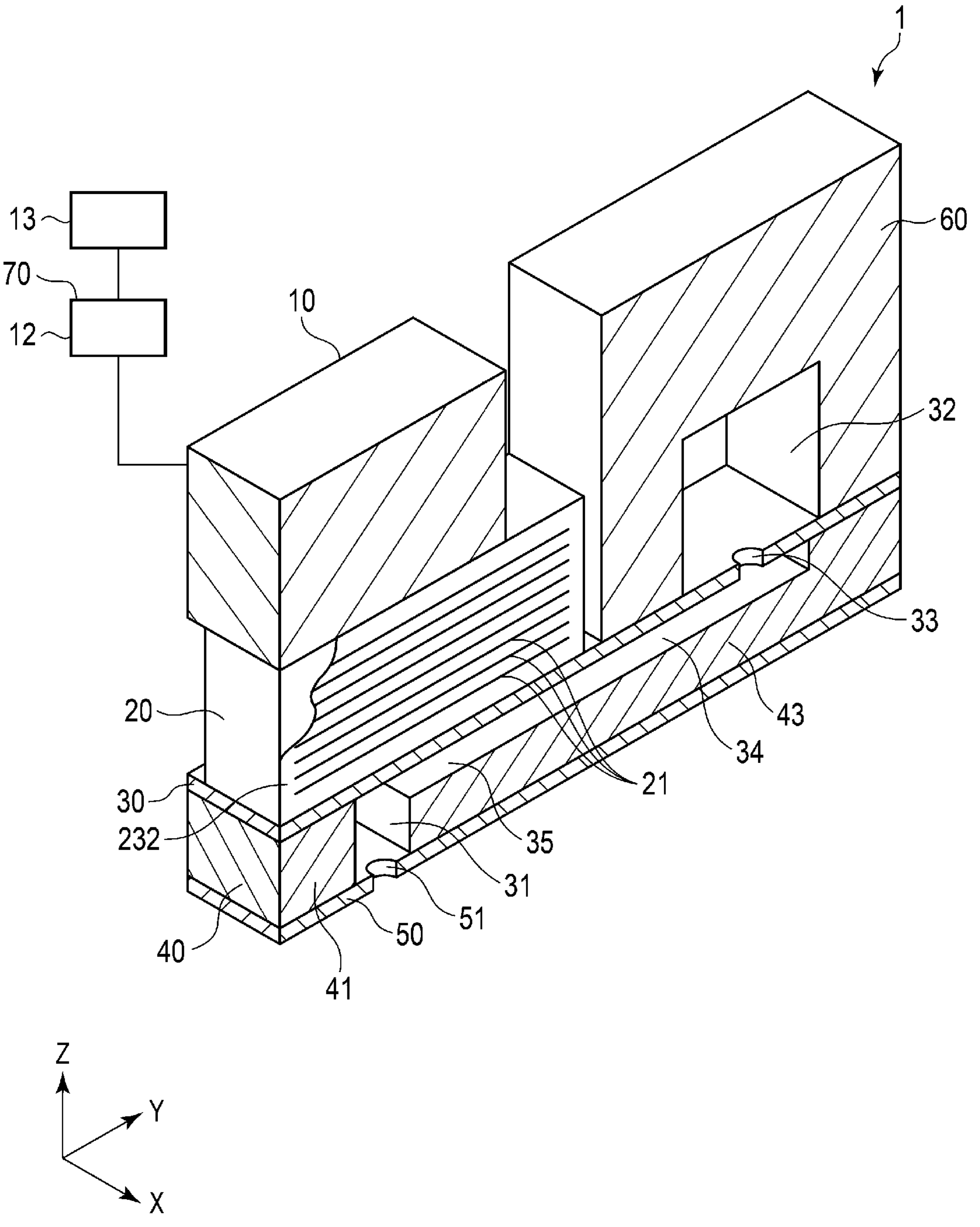
FIG. 1 depicts part of an inkjet head in a perspective view according to a first embodiment.
Figure 2:
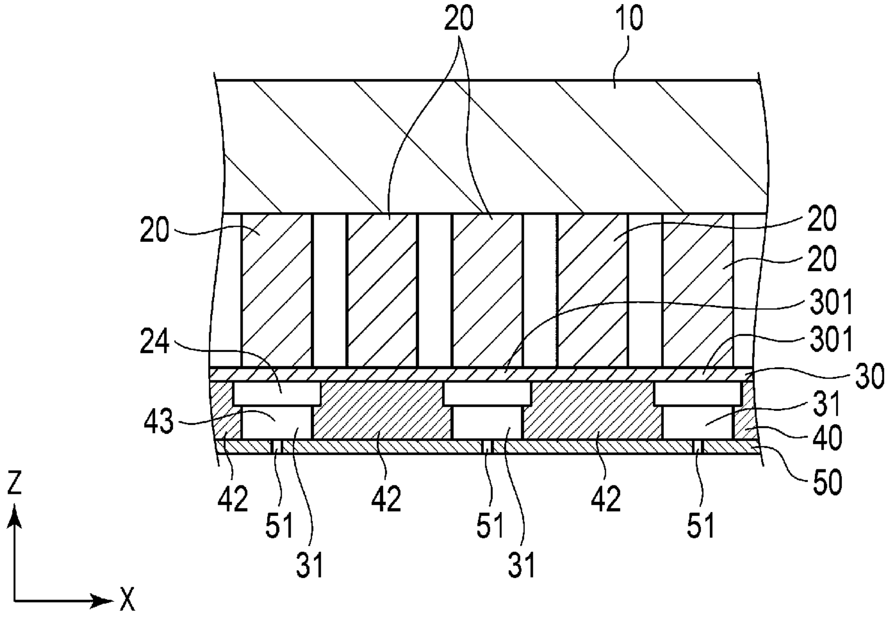
FIG. 2 depicts an inkjet head in a cross-sectional view according to a first embodiment.
Figure 3:
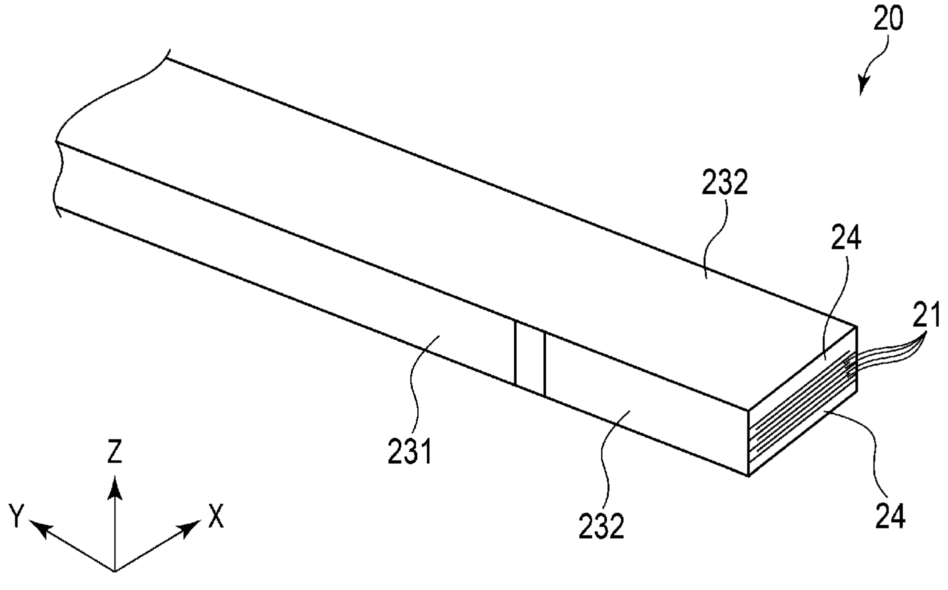
FIG. 3 depicts stacked piezoelectric members of an inkjet head in a perspective view according to a first embodiment.
Figures 4, 5:
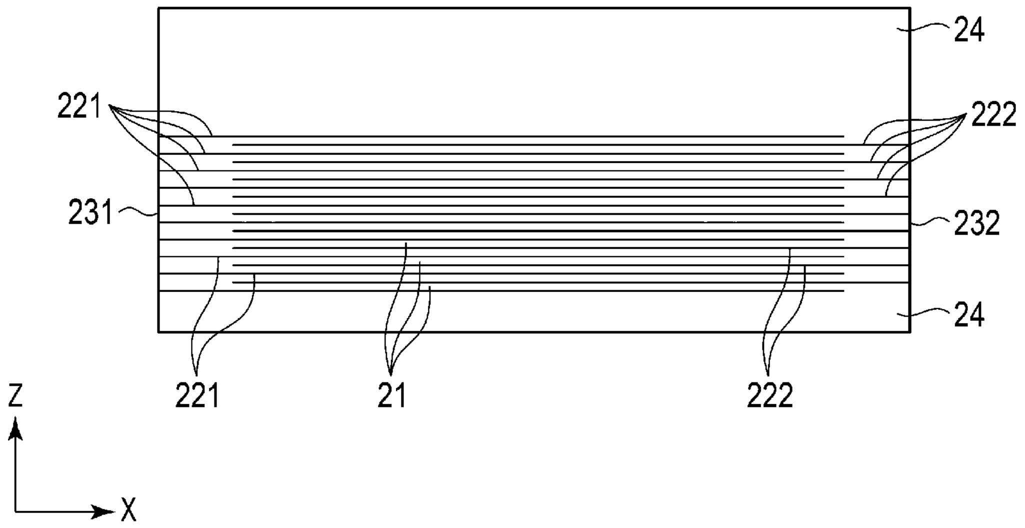
FIG. 4 depicts stacked piezoelectric members of an inkjet head in a side view according to a first embodiment.
FIG. 5 is a table of characteristics of certain piezoelectric materials.
Figure 6:
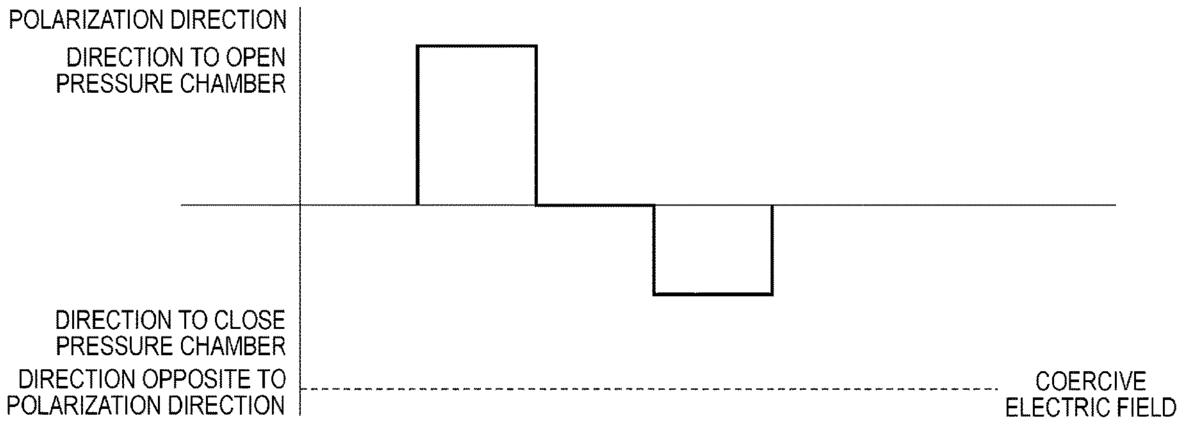
FIG. 6 depicts a drive voltage waveform of an inkjet head.
Figure 7:
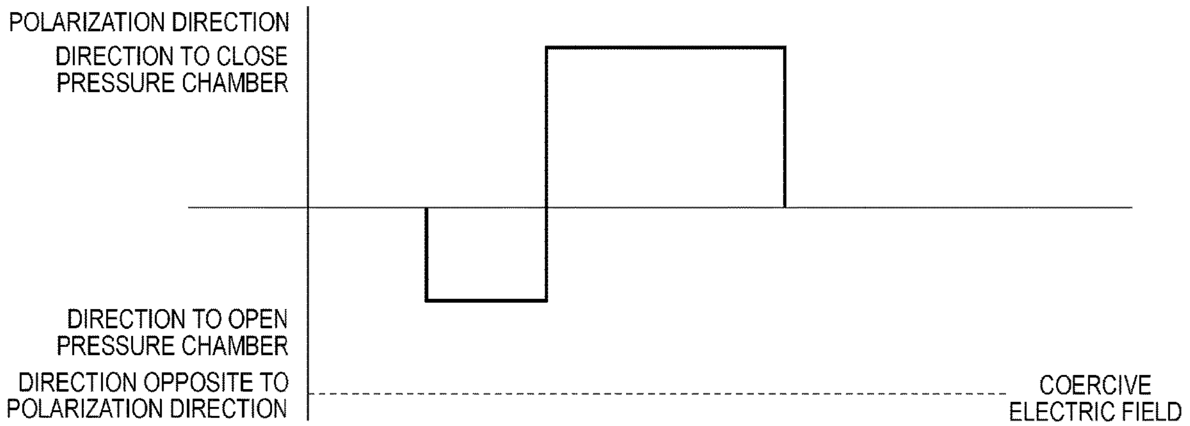
FIG. 7 depicts a drive voltage waveform of an inkjet head.

Hereinafter, certain example embodiments of a liquid ejection head and a liquid ejection device will be described with reference to the accompanying drawings. In one example, an inkjet head 1 (which is one example of a liquid ejection head) and an inkjet recording device 100 (which is one example of a liquid ejection device) will be described with reference to FIGS. 1 to 8. FIG. 1 is a perspective view illustrating a schematic configuration of the inkjet head 1. FIG. 2 is a cross-sectional view of inkjet head 1. FIG. 3 is a perspective view illustrating stacked piezoelectric members of an inkjet head. FIG. 4 is a side view of the same. FIG. 5 is a table of characteristics of certain piezoelectric materials. FIGS. 6 and 7 are explanatory views illustrating aspects of a drive voltage waveform. For purposes of description, illustrated aspects in each drawing may be depicted as enlarged or reduced, or, in some instances, aspects may be omitted from one or more drawings.

The inkjet head 1 includes a base 10, at least one piezoelectric element 20, a diaphragm 30, a manifold 40, a nozzle plate 50 with a plurality of nozzles 51, a frame 60, and a drive unit 70.

The piezoelectric element 20 functions an actuator. The piezoelectric element 20 comprises a plurality of piezoelectric members 21. As depicted in FIG. 1, these piezoelectric members 21 are stacked on each other along a Z direction. Internal electrodes 221 and internal electrodes 222 are formed on each piezoelectric member 21. An external electrode 231 and an external electrode 232 are formed on side surfaces of the piezoelectric element 20. Dummy layers are stacked on the outermost ones of the stacked piezoelectric elements 21.

The piezoelectric element 20 is positioned at an end of the base 10 in the Y direction and is joined (affixed) to the base 10.

Each piezoelectric member 21 is a lead-free piezoelectric material formed in a thin plate shape. The piezoelectric member 21, may be a lead-free piezoelectric material may be a lead-free piezoelectric ceramic comprising potassium sodium niobate as a main component. The piezoelectric members 21 are stacked one on the other along a first direction (Z direction in FIG. 1) and are bonded to each other layer-by-layer with an adhesive layer therebetween.

In the first embodiment, the lead-free piezoelectric material of the piezoelectric element 20 is a piezoelectric material with a piezoelectric constant d33 (also referred to as a piezoelectric modulus) that deteriorates 10% or less if the drive voltage produces an electric field that is equal to or less than a coercive electric field. In this context, the piezoelectric constant d33 corresponds to the volume change of the piezoelectric material when subjected to an electric field. The piezoelectric material is particularly selected such that the deterioration of the piezoelectric constant d33 of the piezoelectric member 21 will be 10% of less after the piezoelectric member 21 has been continuously driven by a drive waveform for 10 minutes at maximum drive frequency. Additionally, the selected lead-free piezoelectric material for piezoelectric members has a piezoelectric constant d33 of at least 200 pC/N at a steady state. The piezoelectric constant at steady state is a standard value for a standardized use state which is generally reported by a manufacturer of the piezoelectric member as a catalog entry value. This value for a piezoelectric constant d33 is the value as measured according to JISR1696 (Japanese Industrial Standard). As one example of the material appropriate for piezoelectric members 21, lead-free piezoelectric ceramic comprising potassium sodium niobate as a main component can be used. FIG. 5 is a table with characteristics of certain piezoelectric materials. The values are from Chapter 3 of "Lead-free Piezoelectric Ceramics Devices", edited by Japan AEM Society, Yokendo. FIG. 5 lists values for the piezoelectric constant (d33) and Curie temperature for: PZT, barium titanate-based material ("$BaTiO_3$"), bismuth sodium titanate-based material ("$(BiNa)TiO_3$"), bismuth potassium titanate-based material ("$(BiK)TiO_3$"), and potassium sodium niobate-based material (KNN)("$K0.5Na0.5NbO_3$"). The piezoelectric constant d33 of PZT is about 400 pC/N, and the Curie temperature is about 300° C. The piezoelectric constant d33 of barium titanate-based material is 350 pC/N or more, and the Curie temperature is about 130° C. The piezoelectric constant d33 of b $(BiNa)TiO_3$-based material is about 220 pC/N, and the Curie temperature is about 278° C. The piezoelectric constant d33 of $(BiK)TiO_3$-based material is 97 about pC/N, and the Curie temperature is about 520° C. The piezoelectric constant d33 of KNN-based material is about 250 pC/N, and the Curie temperature is about 400° C.

Among these piezoelectric materials, the piezoelectric constant of $BaTiO_3$-based material is greater than the piezoelectric constant of the $(BiNa)TiO_3$-based material, $(BiK)TiO_3$-based material, and KNN-based material. The Curie temperature of the barium titanate-based material is lower than the Curie temperature of $(BiNa)TiO_3$-based, $(BiK)TiO_3$-based, and KNN-based materials. Due to these characteristics, both the manufacturing process of $BaTiO_3$-based material and the operating temperature are somewhat restricted.

The piezoelectric constant (d33) of $(BiK)TiO_3$-based material is less than the piezoelectric constant (d33) of the other materials. Therefore, with a $(BiK)TiO_3$-based material, in order to realize the same ejection as PZT, it is necessary to increase the drive voltage, and the piezoelectric element 20 must be larger. On the other hand, the potassium sodium niobate (KNN)-based material has a relative permittivity ($\varepsilon 33/\varepsilon 0$), which is about half the relative permittivity of PZT, and there would be no substantial difference in power consumption. The Curie temperature of (KNN)-based material is higher than the Curie temperature of $(Ba)TiO_3$-based material and $(BiNa)TiO_3$-based material.

The internal electrodes 221 and 222 are conductive films made of a conductive material that can be calcined (exposed to high heat) such as silver-palladium alloy. The internal electrodes 221 and 222 are formed in particular regions on the main surface of each piezoelectric member 21. The internal electrodes 221 and 222 are separated from each other. An internal electrode 221 is formed from one end of the piezoelectric member 21 in the X direction extending toward the other end in the X direction but not reaching the other end. The internal electrode 222 is formed from the opposite end from the internal electrode 221 extending in the X direction but not reaching the other end of the piezoelectric member 21. The internal electrodes 221 and 222 are respectively connected to the external electrodes 231 and 232 formed on a side surface of the piezoelectric element 20.

The external electrode 231 connects to each of the internal electrodes 221. The external electrode 232 connects to each of the internal electrodes 222. Each of the external electrode 231 and 232 is formed by, for example, Ni, Cr, Au, or the like by using a plating method, a sputtering method, or the like. The external electrodes 231 and 232 are separated from each other and can be provided in different regions on the same side surface of the piezoelectric element 20. Alternatively, the external electrodes 231 and 232 may be provided on different side surfaces of the piezoelectric element 20. The internal electrodes 221 and 222 are connected to various other wirings via the external electrodes 231 and 232 to other components, such as a drive IC, via the various wirings.

Each dummy layer 24 is made of the same material as the piezoelectric member 21. The dummy layer 24 has an electrode on only one side and will not deform because an electric field will not be applied since only a single electrode is attached thereto. The dummy layer 24 does not function as a piezoelectric element, but rather serves as a base for fixing or attaching the piezoelectric element 20 to other components. The dummy layer 24 can also provide polishing process margin for the polishing used in manufacturing of piezoelectric element 20 for obtaining dimensional accuracy for assembly purposes or the like.

The piezoelectric element 20 vibrates up and down (vertically) along the stacking direction (Z direction) of the piezoelectric members 21 when a voltage is applied to the internal electrodes 221 and 222 via the external electrodes 231 and 232. In this context, the vertical vibration corresponds to "vibration in the thickness direction defined by the piezoelectric constant d33."

As illustrated in FIG. 2, only half of the piezoelectric elements 20 are disposed so as to be positioned directly above one of the pressure chamber 31 (with the diaphragm 30 interposed therebetween). The other half of the piezoelectric elements 20 are disposed at positions facing one of the partition walls 42 (with the diaphragm 30 interposed therebetween). That is, only every other one of the piezoelectric elements 20 corresponds directly to a pressure chamber 31.

The diaphragm 30 extends in the plane direction orthogonal to the Z direction. The thickness direction of the diaphragm 30 is the Z direction. Other components are above and below the diaphragm in the Z direction. The diaphragm 30 is on one side of the piezoelectric element 20 in the Z direction. More particularly, the diaphragm 30 is on the nozzle plate 50 side of the piezoelectric element 20. As one example, the diaphragm 30 has a plurality of vibrating portions 301 that face the corresponding pressure chambers 31 and that can be individually deformed or displaced. The vibrating portions 301 in the present example are integrally portions of the same diaphragm 30. Alternatively, in other examples, a plurality of diaphragms 30 that can each be individually deformed or displaced may be used instead of a single diaphragm 30.

On one side, the diaphragm 30 is joined to ends of the piezoelectric element 20 The frame 60 is on the same side of the diaphragm 30 as the piezoelectric elements 20 but offset in the Y direction from the piezoelectric elements 20. The manifold 40 is on the other side of the diaphragm 30 from the manifold 40 and the piezoelectric elements 20. At a central portion of the inkjet head 1 in the third direction, the pressure chamber 31 and a guide flow path 34 are formed between the diaphragm 30 and the manifold 40.

A common chamber 32 for accommodating ink is also formed between the diaphragm 30 and the frame 60. That is, one side of the diaphragm 30 faces the piezoelectric element 20 and the common chamber 32, and another side thereof faces the pressure chamber 31, the partition wall 42, and the guide flow path 34.

Each pressure chamber 31 connects to a nozzle 51 formed in the nozzle plate 50.

Pressure chambers 31 and the guide flow paths 34 are separated from each other by a partition wall portion 42 provided on the manifold 40.

The diaphragm 30 has an opening 33 that penetrates in its thickness direction and that connects the pressure chamber 31 and the common chamber 32 via the guide flow path 34. The pressure chamber 31 and the common chamber 32 are on opposite sides of the diaphragm 30 in the Z direction, with the diaphragm 30 therebetween. The common chamber 32 also extends in the X direction and connects with a plurality of pressure chambers 31 arranged in parallel along the X direction. The diaphragm 30 deforms in response to deformation of the piezoelectric elements 20 to change a volume of each individual pressure chamber 31 as appropriate.

The manifold 40 is on one side of the diaphragm 30. The manifold 40 is between the nozzle plate 50 and the diaphragm 30 and includes a predetermined ink flow path 35 formed therein. The ink flow path 35 includes the pressure chambers 31 separated by the partition wall 42 and the guide flow path 34 extending from the pressure chambers 31 toward the opening 33 in the third direction. The manifold 40 also includes a frame-shaped portion 41 joined to one outer edge portion of the diaphragm 30 and a guide wall 43 extending in the third direction toward another outer edge portion of the diaphragm 30. The guide wall 43 forms the guide flow path 34. One side of each of the pressure chambers 31 is closed by the nozzle plate 50 and communicates with the nozzle 51, and another side of the pressure chamber 31 is closed by the diaphragm 30 and communicates with the common chamber 32 via the guide flow path 34 and the opening 33. The pressure chamber 31 holds the ink, as one example of liquid, supplied from the common chamber 32 via the guide flow path 34 and deforms with the vibration of the diaphragm 30 to eject the ink from the nozzle 51.

The nozzle plate 50 is formed of a square plate having a thickness of about 10 μm to 100 μm. The square plate can be made of a metal, such as SUS/Ni (stainless steel/nickel), or a resin material, such as polyimide. The nozzle plate 50 is provided on one side of the manifold 40 to cover and close the one side of the pressure chamber 31. The nozzles 51 are formed penetrating the nozzle plate 50. The nozzles 51 are arranged along X direction to form a nozzle array. Each nozzle 51 is provided at a position corresponding to one of the pressure chambers 31.

The frame 60 is disposed on the other side of the diaphragm 30. The frame 60 along with the diaphragm 30 forms the common chamber 32. The common chamber 32 is formed inside the frame 60 and communicates with the pressure chambers 31 through an opening 33 in the diaphragm 30 and the guide flow path 34.

Accordingly, in the inkjet head 1 of the present embodiment, the nozzle plate 50, the frame 60, the manifold 40, and the diaphragm 30 together form one or more ink flow paths 35 that includes one or more guide flow paths 34; one or more pressure chambers 31 that communicate with the nozzles 51; and the common chamber 32 that communicates with the pressure chambers 31. In this configuration, for example, the common chamber 32 communicates with an ink cartridge, an ink tank, or the like, and ink is supplied to each pressure chamber 31 through each guide flow path 34 in each of the ink flow paths 35.

The drive unit 70 (which may also be referred to as a driver or driving circuit) includes, for example, a drive IC 12 mounted on a circuit board and a control unit 13 connected to the drive IC 12.

The drive IC 12 is electrically connected to the external electrodes 231 and 232 of the piezoelectric element 20 via, for example, a flexible board.

The control unit 13 includes, for example, a memory for storing various variable data and image data, a read only memory (ROM) for storing various programs, a control panel for performing various settings, a central processing unit (CPU) as one example of a processor and the like, and an I/O port as an interface for inputting data from the outside and outputting data to the outside. The control unit 13 controls the drive IC 12 based on the data stored in the image memory and applies a drive voltage to each of the piezoelectric elements 20 to change pressure in each of the pressure chambers 31 and eject ink droplets from the nozzles 51 arranged opposite to the corresponding pressure chambers 31. The control unit 13 may be mounted on the inkjet head 1 or may be provided to a host device such, as an inkjet recording device equipped with the inkjet head 1. The processor may include another processing circuit instead of the CPU.

In the inkjet head 1, the drive unit 70 applies the drive voltage to the internal electrodes 221 and 222 via the wirings and the external electrodes 231 and 232. The drive voltage is applied to each piezoelectric element 20 The piezoelectric element 20 vibrates according to both an electric field (referred to as a first electric field) in the polarization direction of the piezoelectric portion and an electric field (may also be referred to as a second electric field) in a direction opposite to the polarization direction. In the present embodiment, the piezoelectric element 20 vibrates in Z direction (that is, the thickness direction of diaphragm 30 or the stacking direction of the piezoelectric element 20) of the piezoelectric members 21. The piezoelectric element 20 thus vibrates vertically. Due to the vertical vibration of the piezoelectric element 20, the diaphragm 30 also vibrates vertically (up and down in thickness direction) and the pressure chamber 31 deforms in the Z direction. As the internal volume of the pressure chamber 31 changes, ink is fed from the common chamber 32 and then ejected from a nozzle 51.

In the inkjet head 1, liquid droplets are ejected from a nozzle 51 facing the pressure chamber 31 when the drive unit 70 applies a drive voltage to the internal electrodes 221, and 222 of a piezoelectric element 20 to increase or decrease the volume of the corresponding pressure chamber 31. In the present embodiment, the drive unit 70 outputs a drive signal in such a manner that the deterioration in the piezoelectric constant d33 of the piezoelectric member 21 at steady state (after a drive waveform is continuously applied for 10 minutes at the maximum drive frequency) will be 10% or less. Specifically, the drive unit 70 first draws ink to the pressure chamber 31 from the common chamber 32 with an applied electric field for expanding the volume of the pressure chamber 31 and then ejects the ink from the nozzle 51 with an applied electric field contracting the pressure chamber 31 once the pressure chamber 31 returns from the previous expansion.

In this example, the drive voltage is set so that the electric field in the direction opposite to the polarization direction is less than or equal the coercive electric field. For example, the drive voltage is set so that the electric field in the direction opposite to the polarization direction is ½ or less of the coercive electric field. The electric field in the polarization direction is not limited to being the coercive electric field level or less. For example, the electric field in the polarization direction can be set to be greater than the electric field in the direction opposite to the polarization direction. Thus, the voltage in the polarization direction is not limited to the coercive voltage level or less. For example, the electric field in the polarization direction is set to be greater than the voltage in the direction opposite to the polarization direction.

As one example, as illustrated in FIG. 6, if the polarization direction is the direction in which the pressure chamber 31 is expands to increase internal volume, the electric field in the polarization direction (expanding direction) can be greater than the coercive electric field. The electric field in the direction opposite to the polarization direction (reverse polarization direction) for contracting the pressure chamber should be equal to or less than the coercive electric field. In other words, if the polarization direction is the direction in which the pressure chamber 31 expands, the voltage in the polarization direction can be larger than the coercive voltage, but the voltage in the direction opposite to the polarization direction for contracting the pressure chamber 31 is closed should be equal to or less than the coercive voltage level.

On the other hand, if, as illustrated in FIG. 7, the polarization direction is the direction in which the pressure chamber 31 contracts in the internal volume, then electric field in the polarization direction for contracting the pressure chamber can be larger than the coercive electric field, but the electric field in the direction opposite to the polarization direction for expanding the pressure chamber should be equal to or less than the coercive electric field. In other words, if the polarization direction is the direction in which the pressure chamber 31 contracts, the voltage in the polarization direction for contracting the pressure chamber 31 can be larger than the coercive voltage, and the voltage in the direction opposite to the polarization direction for expanding the pressure chamber can be equal to or less than the coercive voltage less.

In the process of manufacturing the inkjet head 1, the piezoelectric element 20 is generally prepared first. For example, a raw material powder is prepared, mixed with a binder, a plasticizer, or the like, kneaded, and molded into a sheet to obtain a sheet-shaped piezoelectric material. The internal electrodes 221 and 222 are then printed on the sheet-shaped piezoelectric material for subsequently forming the piezoelectric members 21. Then, the piezoelectric members 21 are and cut into pieces of a predetermined shape. Subsequently, the individual piezoelectric elements 20 are formed by a firing treatment (heat treatment), separation into predetermined shapes by dicing, printing/fabrication of the external electrodes 231 and 232, and a polarization treatment. The piezoelectric elements 20 are then arranged at a predetermined pitch and attached to the base 10 with an adhesive or the like. The manifold 40 and the frame 60 are joined, and the nozzle plate 50 is bonded such that the nozzles 51 face the pressure chambers 31 to complete the inkjet head 1.

Figure 8:
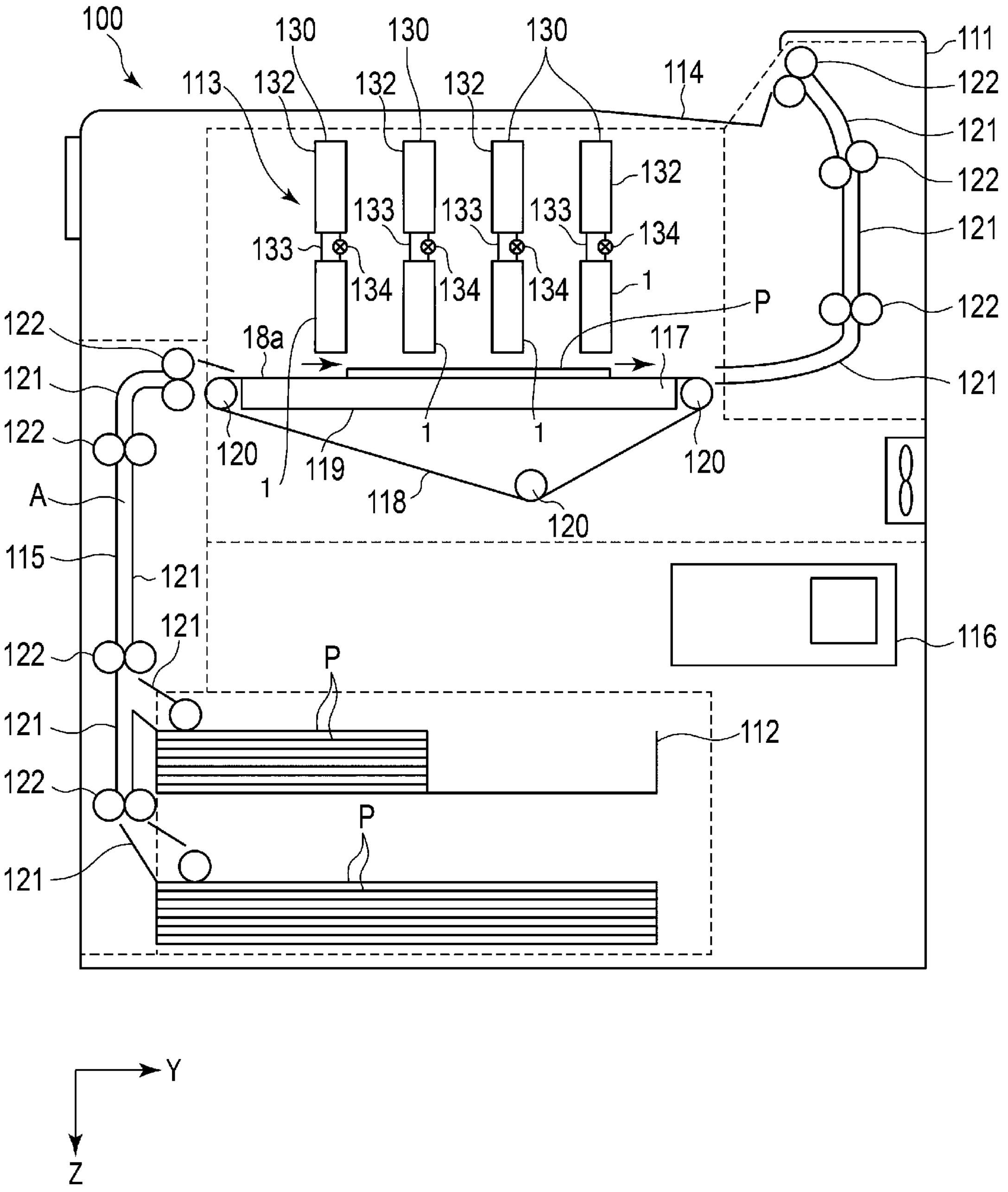
FIG. 8 depicts a schematic configuration of an inkjet recording device.

An example of an inkjet recording device 100 including an inkjet head 1 will be described with reference to FIG. 8. The inkjet recording device 100 includes a housing 111, a sheet supply unit 112, an image forming unit 113, a sheet discharge unit 114, a conveyance device 115, and a control unit 116.

The inkjet recording device 100 is one example of a liquid ejection device that performs image forming processing on paper P by ejecting a liquid, such as ink, while conveying the paper P along a predetermined conveyance path A from the sheet supply unit 112 to the sheet discharge unit 114 through the image forming unit 113.

The housing 111 constitutes an outer frame of the inkjet recording device 100. A discharge port for discharging the paper P to the outside is provided at a predetermined position on the housing 111.

The sheet supply unit 112 is provided with a plurality of paper feed cassettes and configured to stack and hold a plurality of sheets of paper P in various sizes.

The sheet discharge unit 114 includes a discharge tray configured to hold the paper P discharged from the discharge port.

The image forming unit 113 includes a support unit 117 that supports the paper P and a plurality of head units 130 that face the support unit 118 at a position above the support unit 117.

The support unit 117 includes a conveyance belt 118 provided in a loop shape in a predetermined region for image formation, a support plate 119 for supporting the conveyance belt 118 from the back side, and a plurality of belt rollers 120 provided on the back side of the conveyance belt 118.

During image formation processing, the support unit 117 conveys the paper P downstream with the conveyance belt 118 at an appropriate timing by the rotation of the belt rollers 120.

The plurality of head units 130 can be used for ejecting different colors. Each head unit 130 includes an inkjet head 1, an ink tank 132, a connection flow path 133 that connects the inkjet head 1 to the ink tank 132, and a supply pump 134.

In the present example, the inkjet heads 1 for four colors (cyan, magenta, yellow, and black), and the ink tanks 132 respectively containing the inks of these four colors are provided. Each ink tank 132 is connected to the corresponding inkjet head 1 by a connection flow path 133.

A negative pressure control device, such as a pump (not separately illustrated), is also connected to the ink tank 132. The negative pressure control device controls negative pressure inside the ink tank 132 according to water head values (or hydraulic head values) of both the inkjet head 1 and the ink tank 132 to form the ink supplied to each ejection nozzle 51 of the inkjet head 1 into a meniscus having a predetermined shape The supply pump 134 is a liquid feed pump comprising a piezoelectric pump, for example. The supply pump 134 is provided in the supply flow path. The supply pump 134 is connected to a drive circuit of the control unit 116 by wiring and is controlled by a central processing unit (CPU). The supply pump 134 supplies the liquid to the inkjet head 1.

The conveyance device 115 conveys the paper P along the conveyance path A from the sheet supply unit 112 to the sheet discharge unit 114 through the image forming unit 113. The conveyance device 115 includes a plurality of guide plate pairs 121 disposed along the conveyance path A and a plurality of conveyance rollers 122.

Each of the guide plate pairs 121 includes a pair of plate members arranged to face each other sandwiching the paper P therebetween and is configured to guide the paper P along the conveyance path A.

The conveyance rollers 122 are driven by the control of the control unit 116 and rotate to feed the paper P downstream along the conveyance path A. In the conveyance path A, sensors for detecting a conveyance status or condition of the paper P are provided in various appropriate places or at predetermined positions within the inkjet recording device 100.

The control unit 116 includes a control circuit as a controller, such as a CPU, a read only memory (ROM) that stores various programs, a random-access memory (RAM) that temporarily stores various variable data and image data, and an interface that receives data from outside of the inkjet recording device 100, such as a separate unit, an external device and a network, and outputs data to the outside.

In the inkjet recording device 100 according to the present embodiment, upon detection of a print instruction entered by a user who operates an operation input unit of an operation interface provided to the inkjet recording device 100, the control unit 116 drives the conveyance device 115 to convey the paper P along the conveyance path A and outputs one or more print signals to the head units 130 at a predetermined timing to drive the inkjet heads 1.

As part of liquid ejection operation, the inkjet heads 1 send one or more drive signals to their drive ICs 12 (see FIG. 1) by one or more image signals in response to the image data, apply the drive voltages to the internal and external electrodes 221, 222, 231, 232 (see FIG. 4) via the wirings, selectively drive the piezoelectric elements 20 so that the piezoelectric elements 20 vibrate vertically in the stacking direction and that the volumes of the pressure chambers 31 change. This way, the ink ejects from the nozzles 51 of the corresponding pressure chambers 31, and one or more images are formed on the paper P held on the conveyance belt 118. During this operation, the control unit 116 controls or sets the drive voltages such that the electric field in the direction opposite to the polarization direction becomes equal to or less than the coercive electric field of the piezoelectric member 21 in each of the inkjet head 10. Also, as part of the liquid ejection operation, the control unit 116 drives the supply pump 134 to supply the ink from the ink tank 132 to the common chamber 32 of each of the inkjet heads 1.

According to these example embodiments, it is possible to provide an inkjet head 1 incorporating a lead-free piezoelectric material and an inkjet recording device 100 incorporating such an inkjet heat 1. The inkjet head 1 including the piezoelectric element that uses the lead-free piezoelectric material can maintain liquid ejection performance by using electric fields in both the polarization direction and the opposite direction in combination and prevent deterioration of the piezoelectric member 21 by setting the electric field in the direction opposite to the polarization to be equal to or less than the coercive electric field. For example, in the case of PZT, due to its larger piezoelectric constant, it is possible to eject liquid by simply contracting (pulling) the PZT, and it is possible to eject liquid at a lower voltage by pushing (expanding) the PZT in the opposite direction. On the other hand, the lead-free piezoelectric material has a smaller piezoelectric constant. For example, the piezoelectric constant of potassium sodium niobate (KNN) is about half that of PZT, and therefore a higher voltage is required for similar performance using the same drive waveform. That is, it is difficult to obtain a large displacement using just the electric field in the polarization direction alone because d33 is only extension and d31 is only contraction. However, in the inkjet head 1, the pressure chamber 31 can be expanded and contracted by combining not only the electric field (the first electric field) in the polarization direction but also the electric field (the second electric field) in the opposite direction to the polarization direction. In such an operation, if the voltage is higher in the direction opposite to the polarization, the polarization might deteriorate due to the influence of the coercive electric field, which is an electric field that reverses polarization. But deterioration of the piezoelectric member 21 can be suppressed or mitigated by managing the electric field in the direction opposite to the polarization direction to not exceed the coercive electric field. Furthermore, depending on the lead-free piezoelectric material, deterioration begins from about ½ of the coercive electric field, and therefore such deterioration can be prevented by setting the electric field in the direction opposite to the polarization direction to be ½ or less of the coercive electric field. Furthermore, the liquid ejection performance can be maintained by not limiting the electric field in the polarization direction to the coercive electric field or less, that is by maintaining the electric field in the polarization direction to be greater than the coercive electric field. Furthermore, the adverse influence on liquid ejection can be suppressed or mitigated by selecting the piezoelectric material and the drive voltage such that the deterioration of the piezoelectric constant d33 of the lead-free piezoelectric member is 10% or less.

Since with a potassium sodium niobate-based material there are fewer process restrictions and characteristics close to those of PZT can be obtained, it is possible to incorporate this lead-free piezoelectric material into existing stacked vertically vibrating inkjet head designs such as those normally utilizing PZT.

Furthermore, by driving the piezoelectric element with vibration in the stacking direction, it is possible to make the piezoelectric element 20 smaller in size yet still obtain the required displacement amount. For example, the displacement amount of the inkjet head 1 can be increased by increasing the number of stacked layers of piezoelectric members 21, and it is somewhat easier to obtain a desired displacement in combination with a reasonable operating voltage. Still further, because the thickness of the piezoelectric element 20 can be made smaller in the layer direction, both the influence on the size and the influence on the actuator pitch will be small even if the number of layers is increased. This makes it possible to realize a desired displacement amount in a reasonable size while using a lead-free piezoelectric material that has a smaller piezoelectric constant that a PZT-type material. Additionally, by using a lead-free piezoelectric material, it is possible to provide an environment friendly liquid ejection head and liquid ejection device, such as the inkjet head 1 and the inkjet recording device 100 of the present disclosure.

The present disclosure is not limited to the above-described examples embodiments, Components, elements, configurations, and the like can be modified without departing from the gist of the present disclosure.

For example, while in the first embodiment, a plurality of layers of the piezoelectric members 21 are stacked on each other in the vertical direction to form the piezoelectric element 20, and the piezoelectric element 20 is driven by using vertical vibration (d33) in the stacking direction, embodiments are not limited thereto. For example, the piezoelectric element 20 may be made of a single-layer piezoelectric member and/or may be driven by horizontal vibration (d31).

Figure 9:
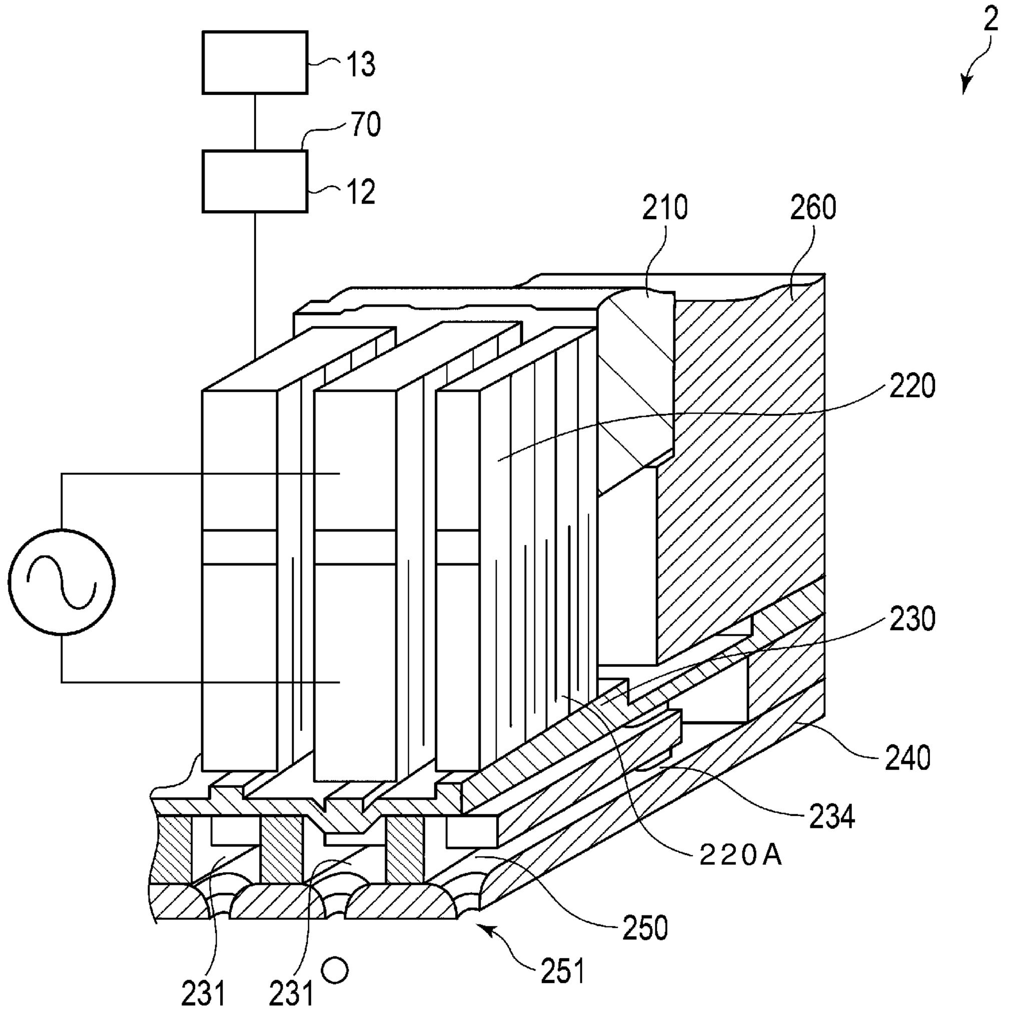
FIG. 9 depicts a part of an inkjet head in a perspective view according to a second embodiment.

An inkjet head 2, as illustrated in FIG. 9, is configured to be driven by using horizontal vibration (that is, vibration in the horizontal direction orthogonal to the thickness direction of diaphragm 230) along the direction in which the piezoelectric members 220A in piezoelectric element 220 are arranged adjacently to each other. The inkjet head 2 includes a base 210, a plurality of piezoelectric elements 220 (spaced from each other in a direction perpendicular to the arrangement/stacking direction of piezoelectric members 220A within each piezoelectric element 220), a diaphragm 230, a manifold 240 (forming a plurality of pressure chambers 231 and a guide flow path 234), a nozzle plate 250 (having a plurality of nozzles 251), and a frame 260. The inkjet head 2 can maintain or further improve the liquid ejection performance and prevent or mitigate the deterioration of the polarization of each piezoelectric member 220A by driving the piezoelectric element 220 with both the electric field (the first electric field) in the polarization direction and the electric field (the second electric field) in the direction opposite to the polarization direction and by keeping the electric field (the second electric field) in the direction opposite to the polarization direction equal to or less than the coercive electric field. In other words, it is possible to maintain or further improve the liquid ejection performance and prevent or mitigate the deterioration of the polarization of the piezoelectric member by driving the piezoelectric element 220 with both a voltage in the polarization direction and a voltage in the direction opposite to the polarization direction and by keeping the voltage in the direction opposite to the polarization direction equal to or less than the coercive voltage.

Figure 10:
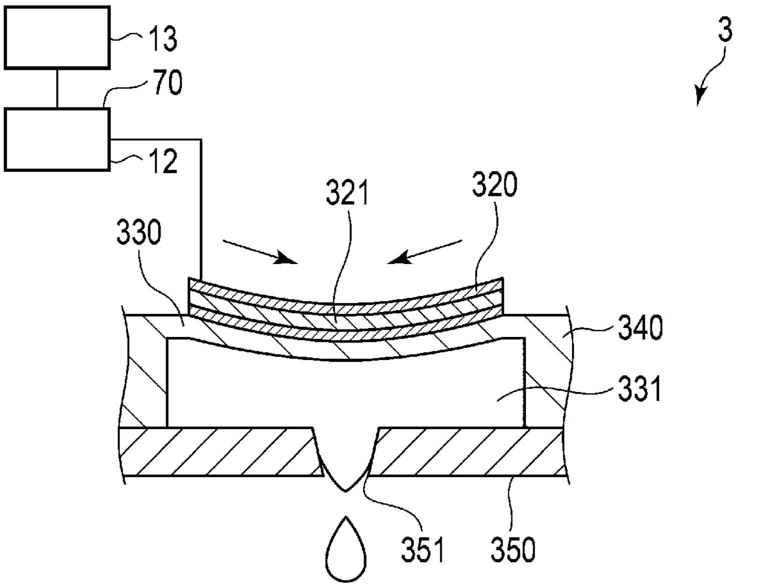
FIG. 10 is an explanatory diagram of an inkjet head according to a modified embodiment.

A bending type inkjet head 3 is illustrated in FIG. 10 as another example embodiment. The inkjet head 3 includes a piezoelectric element 320, a diaphragm 330, a manifold 340, and a nozzle plate 350. The piezoelectric element 320 includes a thin plate-shaped piezoelectric member 321. The manifold 340 forms a plurality of pressure chambers 331. The nozzle plate 350 includes a plurality of nozzles 351.

In the bending type inkjet head 3, the thin plate-shaped piezoelectric member 321 expands and contracts in the horizontal direction, and the diaphragm 330 deforms in a bending manner to pressurize ink in the pressure chamber 331 provided underneath the diaphragm 330.

The inkjet head 3 can maintain or further improve the liquid ejection performance and prevent or mitigate the deterioration of the polarization of the piezoelectric member 321 by driving the piezoelectric element 320 with both the electric field (the first electric field) in the polarization direction and the electric field (the second electric field) in the direction opposite to the polarization direction and by keeping the electric field (the second electric field) in the direction opposite to the polarization direction equal to or less than the coercive electric field. In other words, it is possible to maintain or further improve the liquid ejection performance and prevent or mitigate the deterioration of the polarization of the piezoelectric member 321 by driving the piezoelectric element 320 with both a voltage in the polarization direction and a voltage in the direction opposite to the polarization direction and by keeping the voltage in the direction opposite to the polarization direction equal to or less than the coercive voltage.

Figure 11:
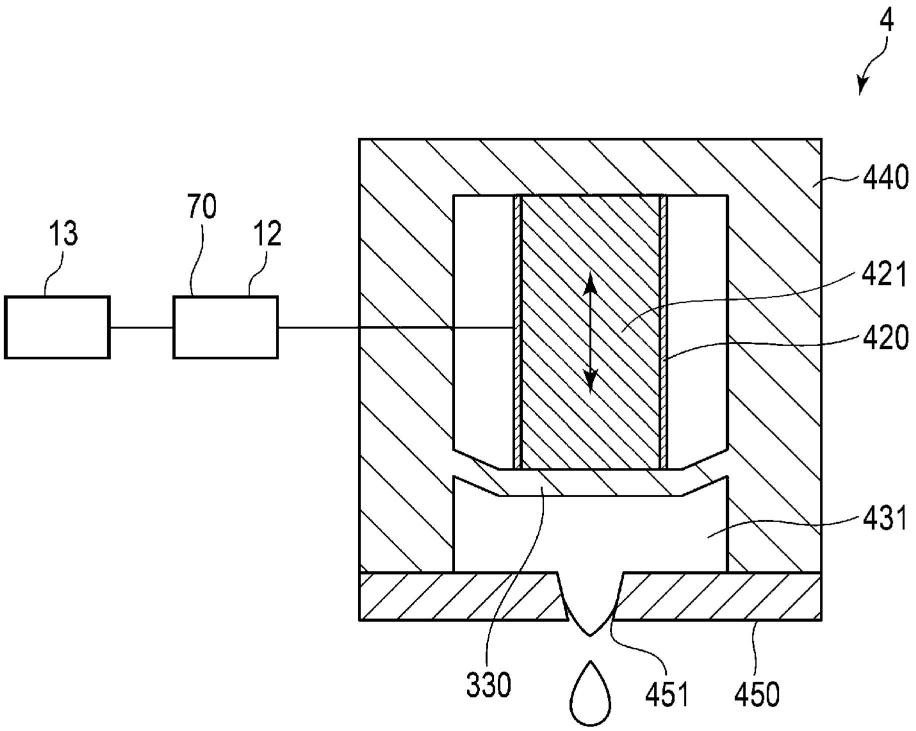
FIG. 11 is an explanatory diagram of an inkjet head according to a modified embodiment.

A piston type inkjet head 4 is illustrated in FIG. 11 as another example embodiment. The piston type inkjet head 4 is configured to press a diaphragm 330 by direct expansion and contraction of a piezoelectric member 421 in the vertical direction to pressurize ink in a pressure chamber 431 provided underneath the diaphragm 330.

The piston type inkjet head 4 includes a piezoelectric element 420, a manifold 440, and a nozzle plate 450 in addition to the diaphragm 330. The piezoelectric element 420 includes the piezoelectric member 421. The manifold 440 forms a plurality of pressure chambers 431. The nozzle plate 450 includes a plurality of nozzles 451.

The inkjet head 4 of the modified embodiment can maintain or further improve the liquid ejection performance and prevent or mitigate the deterioration of the polarization of the piezoelectric member 421 by driving the piezoelectric element 420 with both the electric field (the first electric field) in the polarization direction and the electric field (the second electric field) in the direction opposite to the polarization direction, which are drive electric fields, and by keeping the electric field (the second electric field) in the direction opposite to the polarization direction equal to or less than the coercive electric field. In other words, it is possible to maintain or further improve the liquid ejection performance and prevent or mitigate the deterioration of the polarization of the piezoelectric member by driving the piezoelectric element 420 with both a voltage in the polarization direction and a voltage in the direction opposite to the polarization direction and by keeping the voltage in the direction opposite to the polarization direction equal to or less than the coercive voltage.

The configurations of the piezoelectric elements 20, 220, 320, 420, the shape of the flow path of the ink, and the configuration and positional relationship of various components, such as the manifolds 40, 240, 340, 440, the nozzle plates 50, 250, 350, 450, and the frames 60, 260, are not limited to the present example embodiments. Such configurations can be modified as appropriate according to design constraints, operational preferences, and the like.

The arrangement of the nozzles 51, 251, 351, 451 and the pressure chambers 31, 231, 331, 431 is not limited to the above examples. For example, the nozzles 51 and the like may be arranged in two or more rows. A dummy chamber may also be formed between the pressure chambers 31 and the like.

While in the first embodiment, the piezoelectric element 20 has the dummy layers 24 provided at both ends thereof in the stacking direction, embodiments are not limited thereto. For example, one dummy layer 24 may be provided on just one end side of the piezoelectric element 20, or the piezoelectric element 20 may not have any dummy layers 24.

The liquid to be ejected is not limited to the ink for printing. For example, a liquid containing conductive particles for forming a wiring pattern of a printed circuit board may be used.

While the inkjet head 1 can be used in a liquid ejection device, such as the inkjet recording device 100, embodiments are not limited thereto. For example, the inkjet head 1 or the like can be used for 3D printers, industrial manufacturing machines, medical applications, or the like and can make them smaller in size and weight and further efficient in cost.

While certain embodiments have been described, these embodiments have been presented by way of example only and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid ejection head, comprising:

an actuator with a piezoelectric element comprising a lead-free piezoelectric material;

a pressure chamber connected to a nozzle; and a driver configured to apply a voltage to the actuator to vibrate the piezoelectric element in a first direction to expand the pressure chamber using a first electric field with a positive polarization direction and then to contract the pressure chamber using a second electric field with a negative polarization direction, the second electric field being less than or equal to a coercive electric field for the piezoelectric element.

2. The liquid ejection head according to claim 1, wherein the lead-free piezoelectric material has a piezoelectric constant d33 of at least 200 pC/N at a steady state.

3. The liquid ejection head according to claim 1, wherein the piezoelectric element is configured to change the volume of the pressure chamber to eject liquid through the nozzle.

4. The liquid ejection head according to claim 1, wherein the piezoelectric element comprises a plurality of stacked layers of the lead-free piezoelectric material.

5. The liquid ejection head according to claim 4, wherein the layers are stacked on the pressure chamber in a vertical direction, and the piezoelectric element vibrates back and forth along the vertical direction.

6. The liquid ejection head according to claim 4, wherein the layers are arranged along the pressure chamber in a horizontal direction, and the piezoelectric element vibrates back and forth along the horizontal direction.

7. The liquid ejection head according to claim 1, wherein the lead-free piezoelectric material comprises potassium sodium niobate.

8. The liquid ejection head according to claim 1, wherein the first electric field in the positive polarization direction is greater than the coercive electric field.

9. A liquid ejection head, comprising:

an actuator including a piezoelectric element comprising a lead-free piezoelectric material;

a pressure chamber configured to change volume with the vibration of the piezoelectric element;

a driving circuit configured to apply a voltage to the actuator to vibrate the piezoelectric element in a first direction to expand the pressure chamber using a first electric field with a positive polarization direction of the piezoelectric element and then to contract the pressure chamber using a second electric field with a negative polarization direction, the second electric field being less than or equal to a coercive electric field for the piezoelectric element; and a nozzle fluidly connected to the pressure chamber, wherein the piezoelectric element comprises a plurality of layers of the lead-free piezoelectric material stacked on each other, and a piezoelectric constant d33 of the lead-free piezoelectric material is at least 200 pC/N at a steady state.

10. The liquid ejection head according to claim 9, wherein the lead-free piezoelectric material comprises potassium sodium niobate.

11. A liquid ejection device, comprising:

a liquid ejection head including:

an actuator including a piezoelectric element comprising a lead-free piezoelectric material; and a pressure chamber connected to a nozzle; and a controller configured to apply a voltage to the actuator to vibrate the piezoelectric element with a first electric field with a positive polarization direction of the piezoelectric element to expand the pressure chamber and then a second electric field with a negative polarization direction to contract the pressure chamber, the second electric field being less than or equal to a coercive electric field of the piezoelectric element.

12. The liquid ejection device according to claim 11, wherein a piezoelectric constant d33 of the lead-free piezoelectric material is at least 200 pC/N at a steady state.

13. The liquid ejection device according to claim 11, wherein the piezoelectric element comprises stacked layers of the lead-free piezoelectric material.

14. The liquid ejection device according to claim 13, wherein the liquid ejection head further comprises a pressure chamber that changes volume in response to vibrations of the piezoelectric element.

15. The liquid ejection device according to claim 13, wherein the stacked layers of the lead-free piezoelectric material are stacked in a vertical direction, and the piezoelectric element vibrates in the vertical direction.

16. The liquid ejection device according to claim 13, wherein the stacked layers are stacked in a horizontal direction, and the piezoelectric element vibrates in the horizontal direction.

17. The liquid ejection device according to claim 11, wherein the lead-free piezoelectric material comprises potassium sodium niobate.

18. The liquid ejection device according to claim 11, wherein the second electric field is one half or less of the coercive electric field.

19. The liquid ejection device according to claim 11, wherein the first electric field is greater than the coercive electric field.

* * * * *